United States Patent
Lo (10) Patent No.: US 6,394,391 B1
(45) Date of Patent: May 28, 2002

(54) LANDING TRUCK FOR AN AIRCRAFT IN A FORCED LANDING

(76) Inventor: Wen-Chi Lo, No. 2, Lane 29, Chou-Mei St., Pei-Tou Dist., Taipei (TW)

( * ) Notice: Subject to any disclaimer, the term of this patent is extended or adjusted under 35 U.S.C. 154(b) by 0 days.

(21) Appl. No.: 09/814,648

(22) Filed: Mar. 22, 2001

(51) Int. Cl.$^7$ .................................................. B64F 1/12
(52) U.S. Cl. .............................. 244/110 E; 244/110 R; 244/110 A; 244/110 B; 244/110 C; 244/110 D; 244/110 E; 244/110 H; 244/116
(58) Field of Search ............................ 244/110 E, 116, 244/110 R; 114/258, 259, 260, 261, 262, 263

(56) References Cited

U.S. PATENT DOCUMENTS

| | | | | |
|---|---|---|---|---|
| 1,830,228 A | * | 11/1931 | Glennan | 244/110 E |
| 2,246,716 A | * | 6/1941 | Bottrill | 105/463.1 |
| 2,346,633 A | * | 4/1944 | Bottrill | 244/110 E |
| 2,783,005 A | * | 2/1957 | Kane | 244/110 E |
| 3,128,066 A | * | 4/1964 | Bailey | 244/110 E |
| 3,729,262 A | * | 4/1973 | Snead et al. | 114/261 |
| 4,653,706 A | * | 3/1987 | Youssef | 114/262 |
| 5,470,033 A | * | 11/1995 | Tsai et al. | 104/245 |
| 6,230,643 B1 | * | 5/2001 | Guining | 114/261 |

* cited by examiner

*Primary Examiner*—Charles T. Jordan
*Assistant Examiner*—Stephen A. Holzen
(74) *Attorney, Agent, or Firm*—A & J (57) ABSTRACT

A landing truck for receiving an aircraft in a forced landing constituted with a wheeled vehicle independently driven by front and rear engines and steered synchronously via front and rear steering compartments, a landing frame controllably operative in cooperation with a landing angle of the aircraft, a trapping unit and a cushion unit provided on the landing frame for absorbing impact and vibration of the aircraft landing on the landing frame, a supporting and a balancing unit for supporting and balancing the aircraft, and an automatically controlling unit including a set of touch sensors and a monitoring system, whereby the landing of the aircraft can be monitored in multiple viewing angles by operators in the front or the rear steering compartments, which help the operators to steer and control the landing truck in cooperation with the landing aircraft.

15 Claims, 8 Drawing Sheets

LANDING TRUCK FOR AN AIRCRAFT IN A FORCED LANDING

BACKGROUND OF THE INVENTION

1. Field of the Invention

The present invention relates to a landing truck, which is used to receive an aircraft in a forced landing so as to avert danger, particularly when an undercarriage landing gear of the aircraft fails to lower properly.

2. Description of Related Art

When an aircraft has a malfunction during a flight, for example engine or undercarriage failure, the aircraft is forced to land in an emergency. If the aircraft is forced to land on the ground, to ensure safety of the whole aircraft including passengers and flight crews, a huge and complicated emergency landing aid system should be prepared in order to rescue people from danger and/or extinguish probable fire hazard. The undercarriage landing gear normally includes a landing gear nose wheel and two landing gear main wheels, and no matter which wheel of the landing gear fails, the aircraft forced to land faces catastrophic danger.

Therefore, it is an objective of the invention to provide a landing truck for receiving an aircraft in an emergency landing, when the undercarriage landing gear of the aircraft fails to lower properly, so as to mitigate and/or obviate the aforementioned problems.

SUMMARY OF THE INVENTION

The main object of the present invention is to provide a landing truck used to receive an aircraft in a forced landing without undercarriage landing gears lowered properly. The landing truck comprises a wheeled vehicle driven independently by front and rear engines and steered synchronously via front and rear steering compartments, a landing frame being controllably operative in cooperation with a landing angle of an aircraft, a trapping unit and a cushioning unit operatively mounted on the landing frame for absorbing impact and vibration of the aircraft landing on the landing frame, a supporting and a balancing unit for supporting and balancing the aircraft, and an automatic controlling unit including a set of touch sensors and a monitoring system, whereby the operators can monitor the landing of the aircraft from different viewing angles, which helps the operators to steer and control the landing truck to receive the landing aircraft.

Other objects, advantages and novel features of the invention will become more apparent from the following detailed description when taken in conjunction with the accompanying drawings.

DETAILED DESCRIPTION OF THE PREFERRED EMBODIMENT

Figure 1:
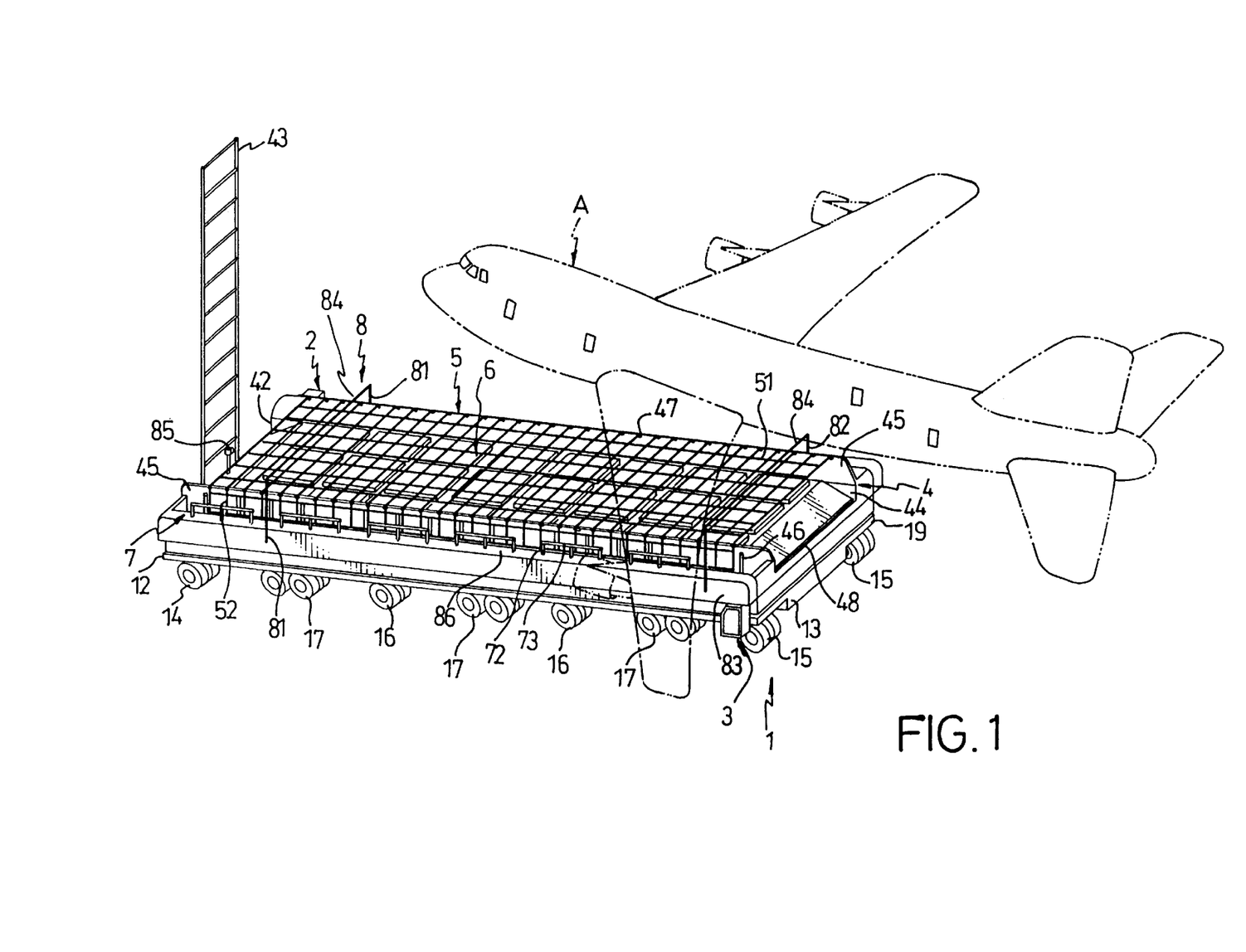
FIG. 1 is a perspective view of a landing truck in accordance with the invention.
Figure 2:
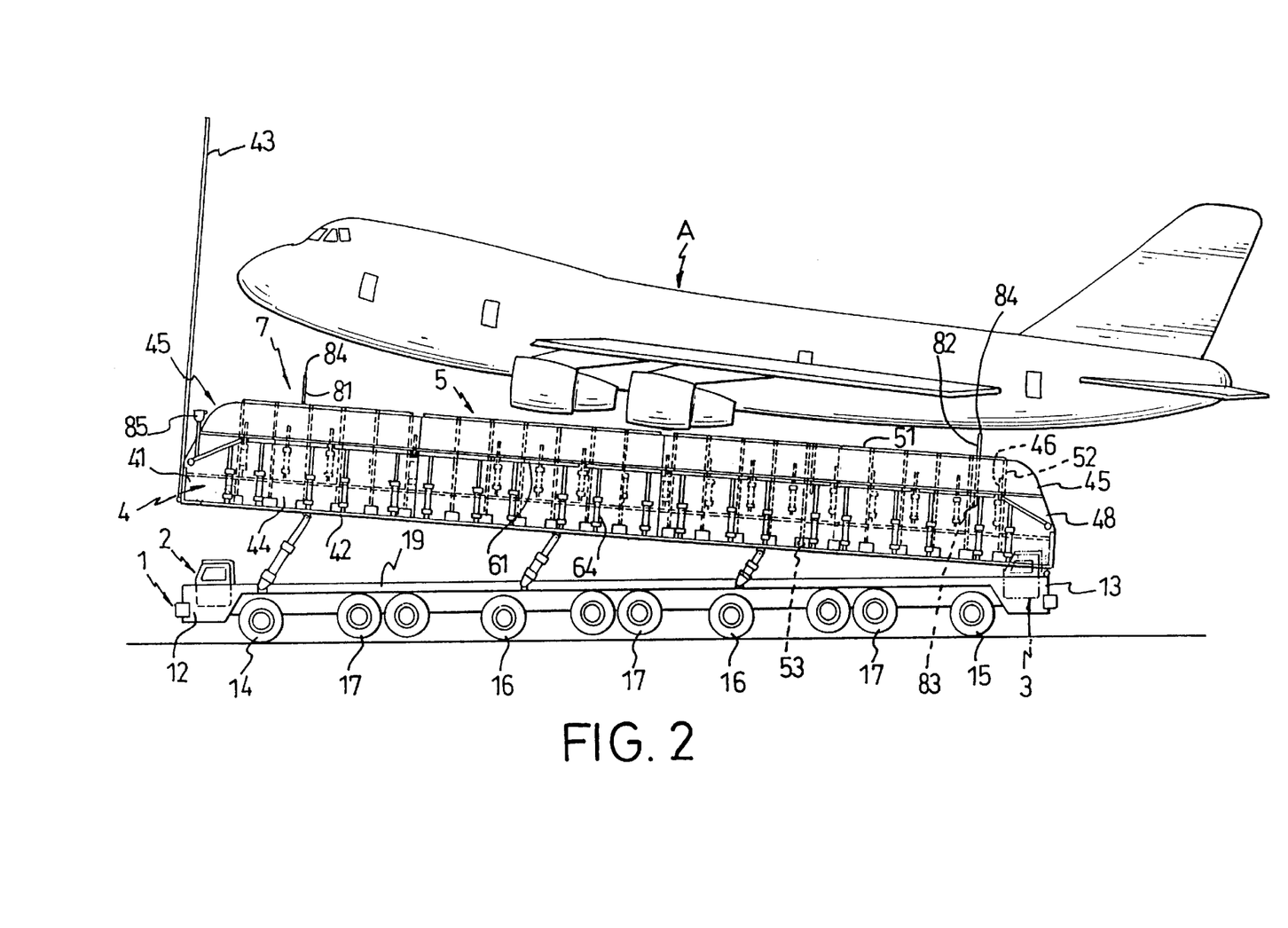
FIG. 2 is a cross sectional side view of the landing truck in accordance with the invention.

As shown from FIGS. 1 and 2, the present invention relates to a landing truck, which is constituted with a wheeled vehicle (1), a front steering compartment (2) and a rear compartment (3) for synchronously controlling and steering of the landing truck, a landing frame (4) placed on the vehicle (1), a trapping unit (5) and a cushioning unit (6), a supporting and balancing unit (7) and an automatic controlling unit (8).

The wheeled vehicle (1) comprises a chassis (11) having a front portion (12) and a rear portion (13) driven by front and rear engines independently. A pair of front guide wheels (14) and a pair of rear guide wheels (15) are respectively provided at the front portion (12) and the rear portion (13), and synchronously controlled by operators in the front and rear steering compartments (2, 3) of the vehicle (1). The front steering compartment (2) and the rear steering compartment (3) are respectively located at opposite sides of the vehicle (1), and able to be launched away from the vehicle (1) in case of emergency.

The wheeled vehicle (1) further has a plurality of pairs of thrust wheels (16) to support the weight of the landing truck, and a plurality of pairs of landing idlers (17) to help support a combined weight of the landing truck and an aircraft (A), as well as the impact of the aircraft (A) landing on the landing truck. The plurality of landing idlers (17) are normally suspended above the ground before the aircraft (A) lands on the landing truck. When the aircraft (A) lands on the landing truck, the landing idlers (17) contact the earth ground to increase a rolling resistance on the landing truck so as to shorten the range of the landing skidding. The front and rear guide wheels (14, 15), the thrust wheels (16) and the landing idlers (17) are respectively provided with speed brake apparatuses (18), as shown in FIG. 3.

Figure 3:
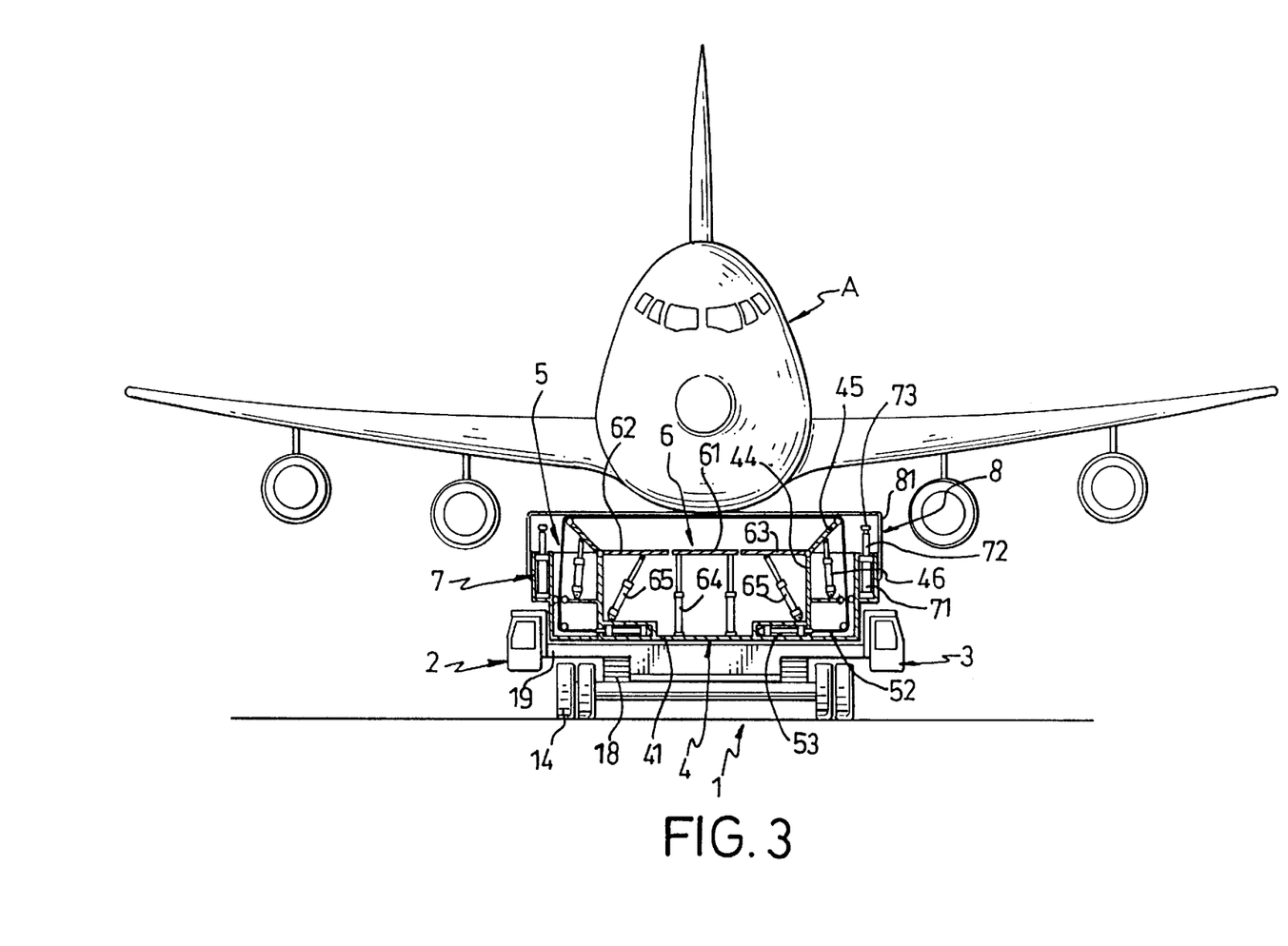
FIG. 3 is a cross sectional front view of the landing truck in accordance with the invention, showing an aircraft touching an upper surface of a trapping unit of the landing truck.

Referring to FIGS. 1, 2 and 3, the landing frame (4) is placed on a top (19) of the chassis (11), and has a bottom base (41), which can be tipped by hydraulic jacks controlled by the operators in one of the front and rear steering compartments (12, 13) in cooperation with a landing angle of the aircraft (A). A front end portion (42) of the bottom base (41) can be raised up by the hydraulic jacks provided between the bottom base (41) and the top (19) of the chassis (11). A sign post (43) is pivoted at the front end portion (42) of the landing frame (4) and retained in an upright condition by an elastic force. The elastic force is suitable for keeping the sign post (43) in the upright condition so as to function only as a visual indicator for pilots of the aircraft (A) to judge their flying distance, elevation and central lines alignment, and not as a retainer of the aircraft (A) when the aircraft (A) lands on the landing frame (4).

With reference to FIG. 3, the landing frame (4) further has two side-walls (44) and two swing boards (45) having first ends thereof respectively pivoted at two upper ends of the side-walls (44), and second ends thereof respectively pivoted with a plurality of equal-spaced actuators (46). The actuators (46) can be controlled by the operators in the front and rear steering compartments (12, 13) to move the swing boards (45) to turn and stay in any desired position in cooperation with the type of the aircraft (A). The shape and space of the side-walls (44) and the swing boards (45) are designed corresponding to configuration and size of the aircraft (A). Each one of the swing boards (45) has a plurality of equal-spaced rollers (47) pivotally mounted along the second end thereof.

Figure 4:
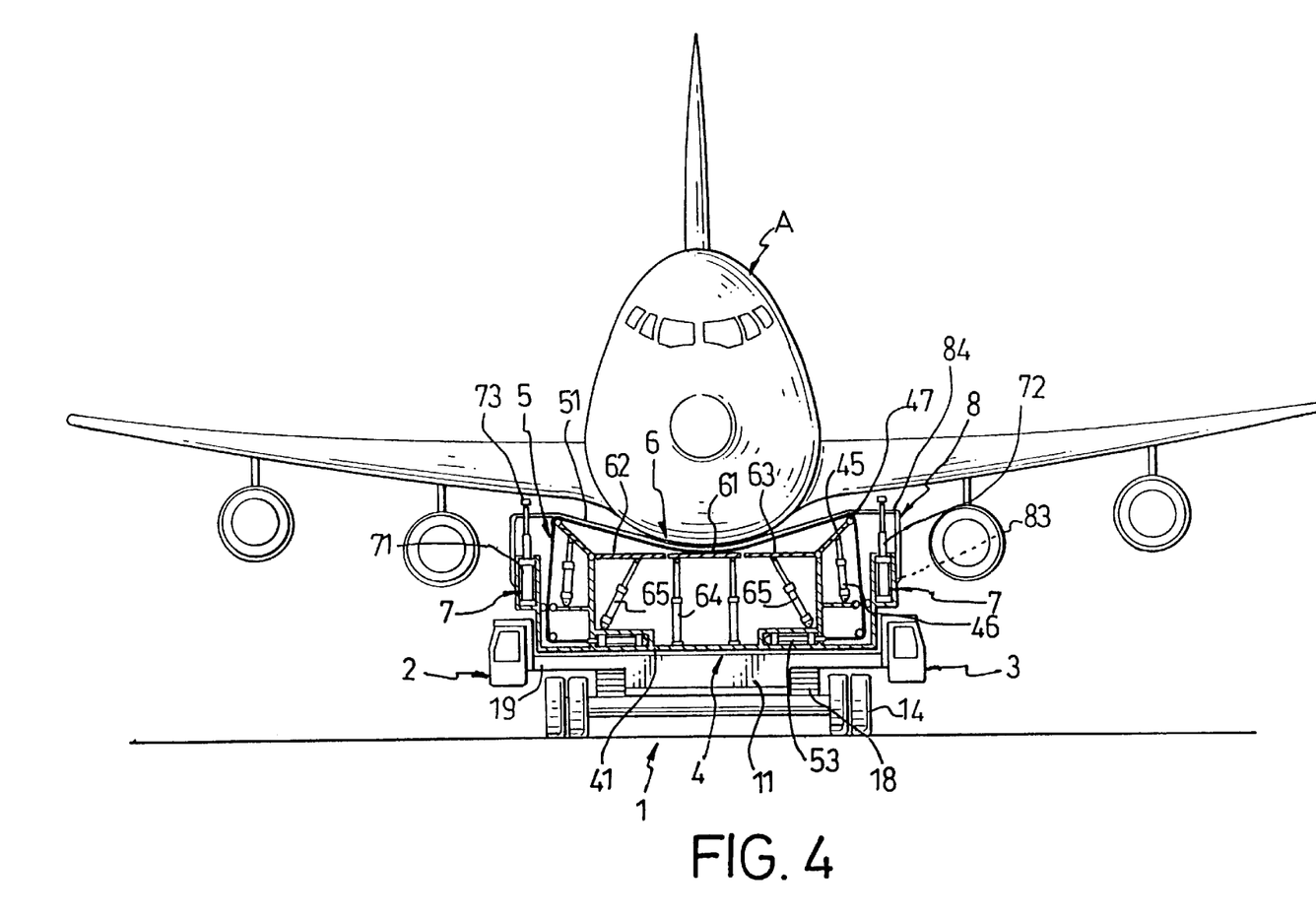
FIG. 4 is a cross sectional front view of the landing truck in accordance with the invention, showing the aircraft lowering onto a top of a cushioning unit of the landing truck.

The trapping unit (5) comprises a trap (51), which is stretched tightly over the second ends of the swing boards (45) and opposite two outer sides of the two side-walls (44). The trap (51) may be made of metal wires or cloth, and has opposite two sides thereof securely connected with a plurality of drag ropes (52) which are respectively driven by a plurality of hydraulic winches (53) placed in the landing frame (4). In a touchdown of the aircraft (A) on the landing truck, at first the fuselage of the aircraft (A) presses the trap (51) downwardly, and at the same time the trap (51) holds the aircraft (A) up with its resilience force to reduce the downward impact force of the aircraft (A) as shown in FIG. 4.

Figure 5:
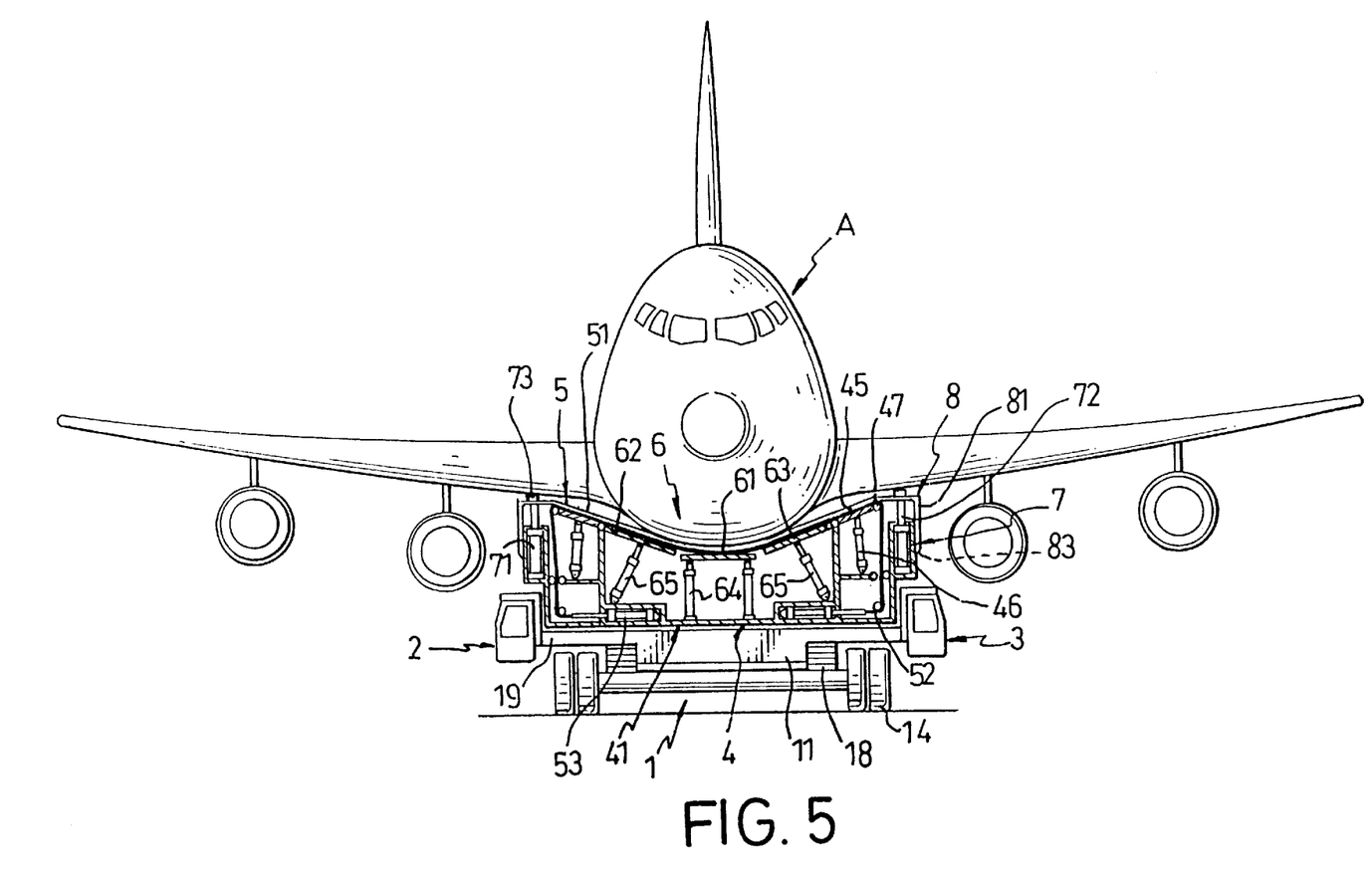
FIG. 5 is a cross sectional front view of the landing truck in accordance with the invention, showing the aircraft covering a cushion space and landing on the landing truck.

The cushioning unit (6) is received in the landing frame (4) and located under the trap (51), and comprises a sectional middle bearer (61) operatively provided in a middle of the landing frame (4), and two sectional side bearers (62, 63) operatively provided at opposite sides of the middle bearer (61). The middle bearer (61) is supported on upper ends of a plurality of equal-spaced hydraulic cushions (64) operatively fixed between the landing frame (4) and the middle bearer (61), whereby the middle bearer (61) is movable in a vertical direction. The side bearers (62, 63) have two outer ends thereof respectively pivoted with the two upper ends of the side-walls (44), and two inner ends thereof respectively driven by a plurality of equal-spaced hydraulic cushions (65) operatively fixed between the landing frame (4) and the side bearers (62, 63), whereby the side bearers (62, 63) are able to pivotally swing about their pivotal axes. When the aircraft (A) is descending on the landing truck, as shown in FIG. 5, the middle bearer (61) and the side bearers (62, 63) are pressed downward by the body portion of the aircraft (A) to provide a concave cushion space for the aircraft (A). The hydraulic cushions (64, 65) respectively absorb vertical and horizontal impact and vibration of the aircraft (A), and in the meantime automatically adjust the positions of the middle and side bearers (61, 62 and 63) to help balancing of the aircraft (A).

The supporting and balancing unit (7) includes two parallel sets of cushion supports (71), which are symmetrically located at opposite two outer sides of the landing frame (4) in a space wide enough for allowing the swing boards (45) to turn to their horizontally extending position, and wider than the width of the body portion of the aircraft (A) and proximally near to wing roots of the aircraft (A). Every certain number of continuation cushion supports (71) have their extension rods (72) connected with one horizontally extending supporting blade (73) at upper ends thereof. When the wings of the aircraft (A) touch one pair of the supporting blades (73), the other extension rods (72) of the cushion supports (71) are automatically retracted till the supporting blades (73) are lower than the elevation of the horizontally extending swing boards (45). The cushion supports (71) contacting with the wings of the aircraft (A) can be controlled by the operators in the steering compartments (12, 13) in order to balance the aircraft (A).

The automatic controlling system (8) includes a set of touch sensors and a monitoring system. The set of touch sensors comprises a pair of front touch rods (81), a pair of rear touch rods (82), and multiple pairs of touch holes (83) symmetrically provided at opposite sides of the front end portion (42) and a rear end portion (48) of the landing frame (4). The pairs of front and rear touch rods (81, 82) are optionally fixed in two pairs of the touch holes (83) respectively located at the front and rear end portions (42, 48) of the landing frame (4) corresponding to sizes of different types of the aircraft (A). Upper ends of each one pair of the touch rods (81, 82) are connected to each other by an elastic wire (84), which is positioned higher than the elevation of upper ends of the swing boards (45) extending in vertical position. When the aircraft (A) descends on the landing frame (4) of the landing truck, the elastic wires (84) touch the bottom of the fuselage of the aircraft (A) at first. As soon as the aircraft (A) touches the elastic wires (84), a contact signal is automatically sent to the steering compartments (2, 3) of the landing truck, and the landing truck automatically responds accordingly. The monitoring system comprises a digital image pick-up device (85) provided at the front end portion (42) of the landing frame (4), and multiple digital image pick-up devices (86) respectively provided at two opposite sides of the landing frame (4), whereby image signals from different viewing angles can be sent to displays in the steering compartments to be monitored by the operators in order to steer the vehicle (1) and adjust tipping angle of the landing frame (4) in cooperation with landing direction and landing angle. of the aircraft (A). The digital image pick-up devices (85, 86) are respectively controllable by the operators extend out in order to receive images, or to retract so as to be retained in storage chambers in the landing frame (4).

Figure 6:
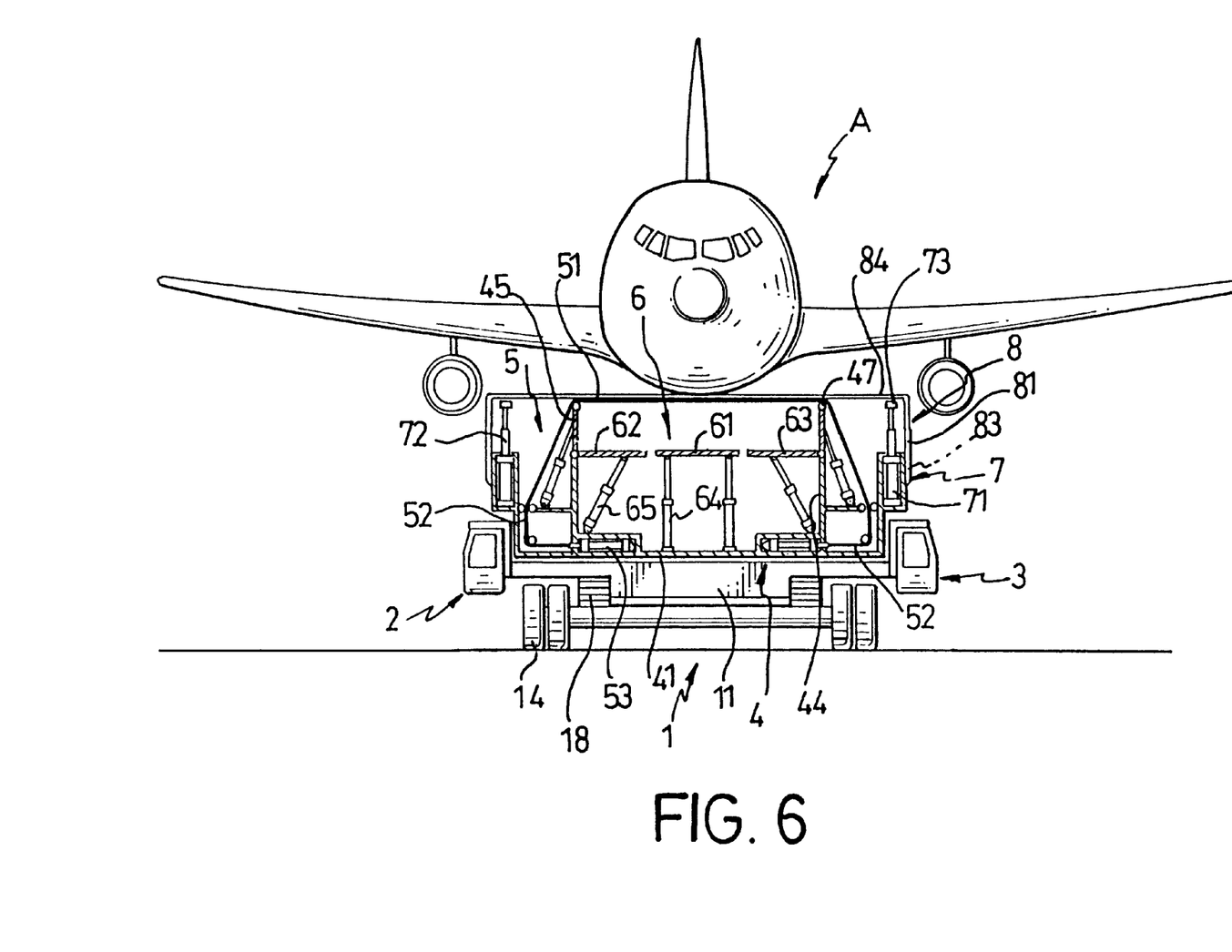
FIG. 6 is a cross sectional front view of a small type aircraft landing on the landing truck in accordance with the invention.

FIG. 6 shows the swing boards (45) are respectively turned to stay at a vertically extending position, so that the space between the swing boards (45) is suitable for receiving a small type aircraft (A').

Figure 7:
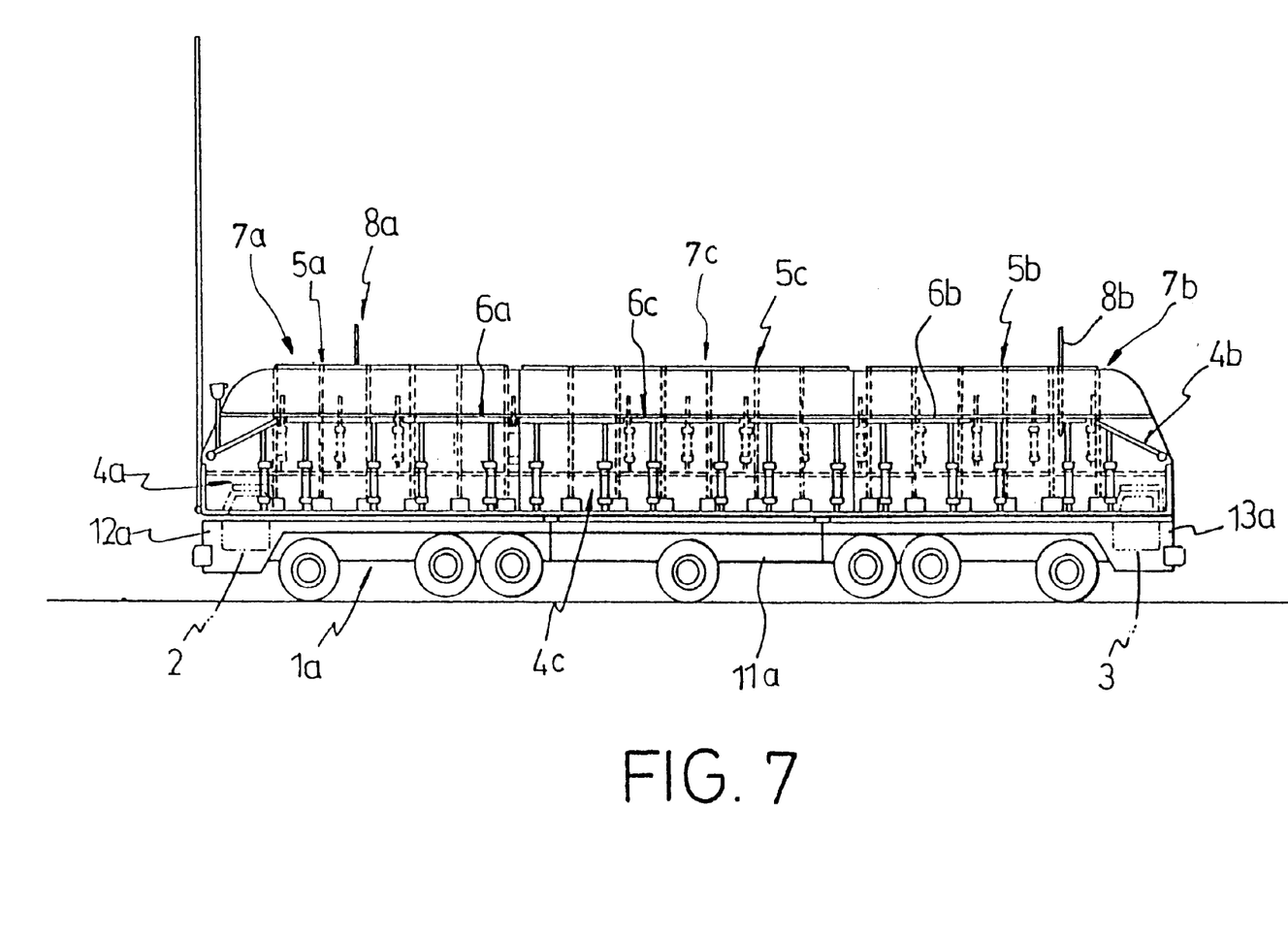
FIG. 7 is a cross sectional side view of a sectional landing truck in accordance with the invention.

FIG. 7 shows another practicable embodiment of the landing truck. A sectional wheeled vehicle (1a) has a front chassis portion (12a) and a rear chassis portion (13a), which are able to be connected together to fit for a small type aircraft, and to be driven independently by front and rear engines and steered synchronously by operators in the front steering compartment (2) and rear steering compartment (3). On the front and rear chassis portions (12a, 13a) of the vehicle (1a), A front landing frame (4a) and a rear landing frame (4b) are respectively placed on the front and rear chassis portions (12a, 13a) of the vehicle (1a). The front landing frame (4a) is equipped with a front trapping unit (5a), a front cushioning unit (6a), a front supporting and balancing unit (7a) and a front automatic controlling unit (8a). The rear landing frame (4b) is equipped with a rear trapping unit (5b), a rear cushion unit (6b), a rear supporting and balancing unit (7b) and a rear automatic controlling unit (8b). A middle chassis portion (11a) of a certain length is optionally added between the front and rear portion (12a, 13a) to receive a wide-body aircraft. The middle chassis portion (11a) is equipped with a middle landing frame (4c), a middle trapping unit (5c), a cushion unit (6c), a supporting and balancing unit (7c) and an automatic controlling unit (8c).

Figure 8:
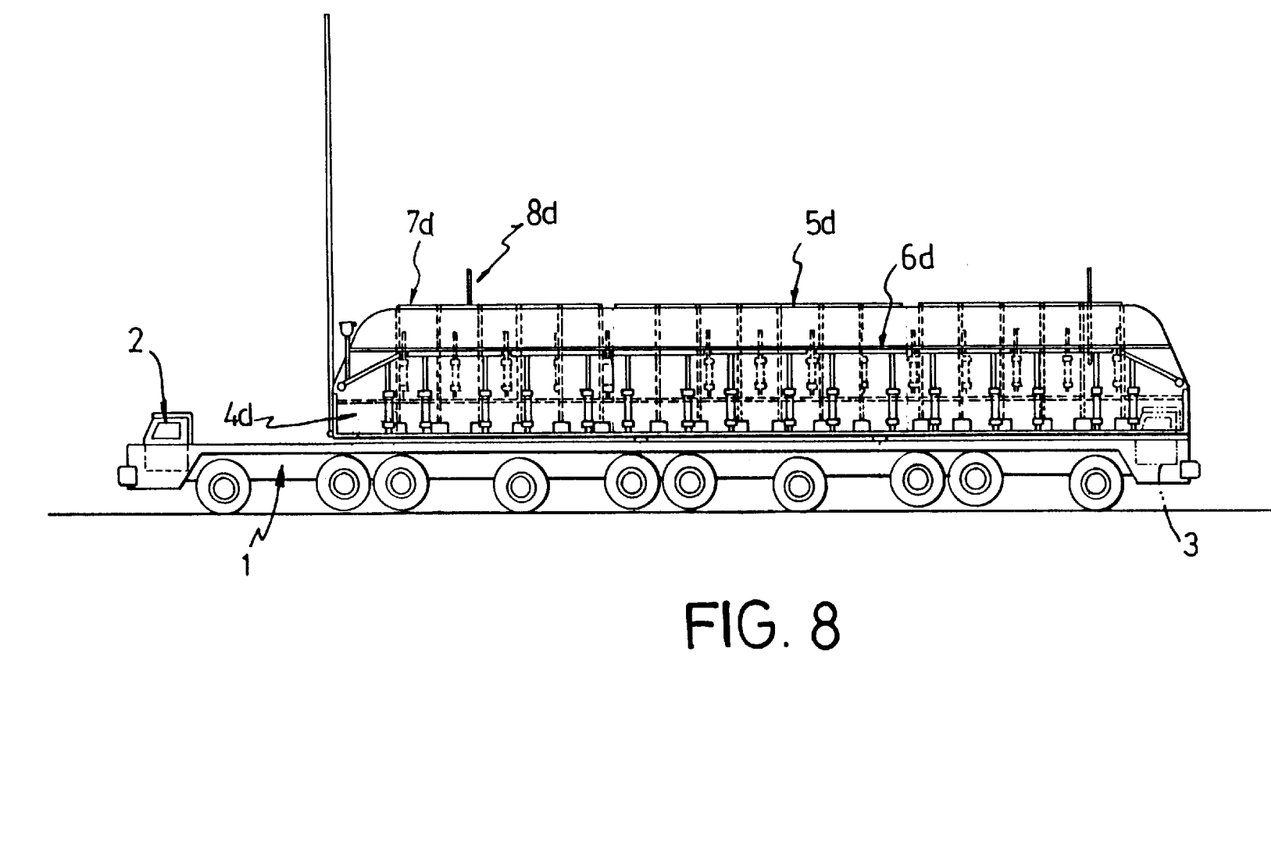
FIG. 8 is a cross sectional side view of a landing truck with an integrally replaceable landing frame placed thereon in accordance with the invention.

FIG. 8 shows a further practicable embodiment of the invention, a landing frame (4d) equipped with a trapping unit (5d), a cushion unit (6d), a supporting and balancing unit (7d) and an automatic controlling unit (8d) is integrally replaceable with a landing frame of a different size corresponding to a different type of aircraft.

It is to be understood, however, that even though numerous characteristics and advantages of the present invention have been set forth in the foregoing description, together with details of the structure and function of the invention, the disclosure is illustrative only, and changes may be made in detail, especially in matters of shape, size, and arrangement of parts within the principles of the invention to the full extent indicated by the broad general meaning of the terms in which the appended claims are expressed.

What is claimed is:

1. A landing truck for receiving an aircraft in a forced landing, the landing truck comprising:
    a wheeled vehicle, which comprises a chassis having front and rear portions thereof independently driven by front and rear engines, a pair of front guide wheels and a pair of rear guide wheels synchronously controlled by operators in front and rear steering compartments respectively provided at opposite sides of the chassis;
    a landing frame, which is operatively placed on a top of the chassis, and forms a bottom base with two side-walls, wherein a front end portion of the bottom base is able to be raised up to tip the landing frame in cooperation with a landing angle of the aircraft;
    a trapping unit having a trap, which is stretched tightly over a top and two opposite outer sides of the landing frame, and has two opposite sides thereof securely connected with a plurality of equal-spaced drag ropes respectively driven by a plurality of hydraulic winches received in the landing frame;
    a cushioning unit, which comprises a sectional middle cushion bearer provided in a middle of the landing frame under the trap and being movable in a vertical direction, and two sectional side cushion bearers symmetrically provided at opposite sides of the middle cushion bearer;
    a supporting and balancing unit comprising two parallel sets of cushion supports symmetrically provided at two opposite outer sides of the landing frame for supporting and balancing the aircraft landing on the landing frame;
    an automatic controlling unit comprising a set of touch sensors, which consists of two pairs of touch rods pivotally fixed in two pairs of touch holes respectively provided at the front and rear portion of the chassis, each two upper ends of one pair of the touch rods connected together by an elastic wire, and a monitoring system, which includes a digital image pick-up device provided at a front end portion of the landing frame and multiple digital image pick-up device provided at opposite sides of the landing frame.

2. The landing truck as claimed in claim 1, wherein the wheeled vehicle has a plurality of pairs of thrust wheels for supporting a weight of the landing truck, and a plurality of pairs of landing idlers for supporting a combined weight of the landing truck and an aircraft, and an impact force of the aircraft landing on the landing truck, the landing idlers being normally suspended before the aircraft lands on the landing truck, and forced to contact the ground to increase a rolling resistance of the landing truck, so as to shorten a landing range of the landing aircraft.

3. The landing truck as claimed in claim 2, wherein the front and rear steering wheels, the thrust wheels and the landing idlers are respectively provided with brake apparatuses.

4. The landing truck as claimed in claim 1, wherein the front and rear steering compartments are able to be launched away from the landing truck in emergency.

5. The landing truck as claimed in claim 1, wherein a sign post is pivoted at a front end portion of the landing frame and retained in an upright condition by an elastic force, the elastic force is suitable for keeping the sign post in the upright condition as a visual indicator for pilots of the aircraft to judge their flying distance, elevation and central lines alignment.

6. The landing truck as claimed in claim 1, wherein two swing boards have two first ends thereof respectively pivoted with two upper ends of the side-walls of the landing frame, and two second ends thereof respectively pivoted with a plurality of equal-spaced actuators, which are controllable by operators in the front and rear steering compartments, each one of the swing boards has a plurality of equal-spaced rollers pivotally mounted along the second end thereof.

7. The landing truck as claimed in claim 1, wherein the trap of the trapping unit is made of metal wires formed as a mesh.

8. The landing truck as claimed in claim 1, wherein the trap of the trapping unit is made of cloth.

9. The landing truck as claimed in claim 1, wherein the middle cushion bearer is supported on upper ends of a plurality of equal-spaced hydraulic cushions operatively fixed between the bottom base of the landing frame and the middle bearer, whereby the middle bearer is movable in a vertical direction; the side cushion bearers have two outer ends thereof respectively pivoted with opposite two upper ends of the side-walls of the landing frame, and two inner ends thereof respectively pivoted with a plurality of equal-spaced hydraulic cushions operatively fixed between the bottom base of the landing frame and the side cushion bearers, whereby the side cushion bearers are pivotally swing about their pivotal axes, when the aircraft lands on the landing frame, the middle cushion bearer and the side cushion bearers are respectively pressed down by the aircraft to provide a concave cushion space for the aircraft.

10. The landing truck as claimed in claim 1, wherein the two sets of cushion supports are spaced wide enough for allowing the swing boards to turn to their horizontally extending position, and wider than the width of the body portion of the aircraft, and located proximally near to wing roots of the aircraft.

11. The landing truck as claimed in claim 10, wherein every certain number of continuation cushion supports have their extension rods connected with one horizontally extending supporting blade at upper ends thereof, as soon as the wings of the aircraft touch one pair of the supporting blades, the other extension rods of the cushion supports are automatically retracted till the supporting blades of these cushion supports are lower than the elevation of the horizontally extending swing boards.

12. The landing truck as claimed in claim 1, wherein the front end portion and the rear end portion of the landing frame have multiple pairs of touch holes respectively provided at opposite sides thereof for optionally fixing the front and rear touch rods therein according to different types of aircraft.

13. The landing truck as claimed in claim 1, wherein the elastic wires of the touch sensors are higher than the elevation of the second ends of the swing boards in their vertically extending position.

14. The landing truck as claimed in claim 1, wherein the wheeled vehicle has a sectional chassis including front and rear chassis portions respectively provided with front and rear landing frames, front and rear trapping units, front and rear cushion units, front and rear supporting and balancing units and front and rear automatically controlling units; a middle chassis portion of a certain length is optionally added between the front and rear chassis portions; the middle chassis portion is provided with a middle landing frame, a middle trapping unit, a middle cushion unit, a middle supporting and balancing unit and a middle automatically controlling units.

15. The landing truck as claimed in claim 1, wherein the landing frame with the trapping unit, the cushioning unit, the supporting and balancing unit, and the automatically controlling unit is integrally replaceable with different sizes of landing frames corresponding to different types of aircraft.

* * * * *